United States Patent [19]

Mackay

[11] Patent Number: 4,754,607
[45] Date of Patent: Jul. 5, 1988

[54] POWER GENERATING SYSTEM

[75] Inventor: Robin Mackay, Rancho Palos Verdes, Calif.

[73] Assignee: Allied-Signal Inc., Morris Township, Morris County, N.J.

[21] Appl. No.: 940,892

[22] Filed: Dec. 12, 1986

[51] Int. Cl.⁴ ............................................. F02C 1/00
[52] U.S. Cl. ...................................... 60/723; 60/737; 237/12.1; 62/236
[58] Field of Search ....................... 237/12.1; 62/236; 60/39.12, 39.14 M, 39.17, 723, 39.882, 39.51 H, 39.82 C, 39.511, 300, 39.02, 39.57, 39.6, 737; 431/328

[56] References Cited

U.S. PATENT DOCUMENTS 3,252,113 11/1967 Payne .
3,797,231  3/1974 McLean .
3,940,923  3/1976 Piefferle .
4,019,316  4/1977 Piefferle .
4,202,169  5/1980 Acheson et al. .

FOREIGN PATENT DOCUMENTS

1467142 12/1965 France .

Primary Examiner—Henry A. Bennet
Attorney, Agent, or Firm—Curtis L. Harrington; J. Henry Muetterties; James W. McFarland

[57] ABSTRACT

A gas turbine driven power generating system to convert fuel to power, both mechanical and electrical, and heat.

28 Claims, 3 Drawing Sheets

POWER GENERATING SYSTEM

BACKGROUND OF THE INVENTION

This invention relates generally to power generation systems. The invention is particularly applicable to such systems in which a fuel is used to produce power, both mechanical and electrical, and heat.

The need has existed for a small power generation device having an economy of scale suitable for small businesses for some time. Many of the problems and design considerations involved in the small power generation systems are described in a paper entitled "Development of a Small-Scale Catalytic Gas Turbine Combustor", *Journal of Engineering for Power*, volume 104, pp. 52-57, January 1982. The article cites problems associated with power generation.

The article discloses that achieving catalyst lightoff is a problem during cold startup of any catalytic device. The lightoff systems evaluated in the article, which are cumbersome and duplicative, include an opposed jet igniter, a packaged burner, an electrical resistance air preheater, an aft-end torch, and hydrogen injection. A discussion of the benefits of each method is included in the article. The method of the present invention is especially new and useful, and when combined with the power generation system, produces an especially desirable and efficient result.

SUMMARY OF THE INVENTION

The power generation system of the present invention comprises a turbine, a compressor, and a generator on a common shaft. A countercurrent heat exchanger is employed to raise incoming compressed fuel to a temperature sufficient to cause combustion to occur in the presence of a catalyst. The combusted products are used to power the turbine, and the resulting mechanical energy extracted by the turbine can power the electical generator.

For startup, the power generation system of the present invention employs a rudimentary burner between the turbine discharge and the inlet to the hot side of the heat exchanger. While the tubine is motored over, using any external source of power or stored energy, the burner will operate on low pressure natural gas to heat the hot side of the heat exchanger thus causing the temperature of the cold side of the heat exchanger to begin experiencing temperature elevation to a point that the catalyst would start to react a fuel-air mixture if it were present. Once the fuel and air are introduced and begin to react, enough heat will be generated that the reaction can be sustained without heat from the burner. The turbine can be motored over by using the generator, which can also be used as a motor, by connecting it to external power. A compressed air device also can be used to motor the system. Power generated from the systems last use can be used to compress and store compressed air to await the next startup.

Locating the preheat combustor downstream of the turbine wheel eliminates the need for an alternate fuel or a fuel gas compressor to provide gas at a sufficiently high pressure to flow into the preheat combustor to start up the system. The electricity production system is especially flexible. Variable frequency alternating current is produced by direct mechanical generation. The variable frequency alternating current is rectified to direct current. The direct current is used to feed an inverter which will produce alternating current at any preselected or variable frequency.

Also eliminated is the need for water injection or selective catalytic reduction, in conventional power generation systems, in order to try to control the NOX (nitrogen oxides) content, which with this arrangement is expected to be in the one to two parts per million volume range. This emission level is less than one-quarter of the most stringent emission requirement currently known.

BRIEF DESCRIPTION OF THE DRAWINGS

Further advantages of the invention will become apparent from the following description and claims, and from the accompanying drawings wherein:

DESCRIPTION OF THE PREFERRED EMBODIMENT

Figure 1:
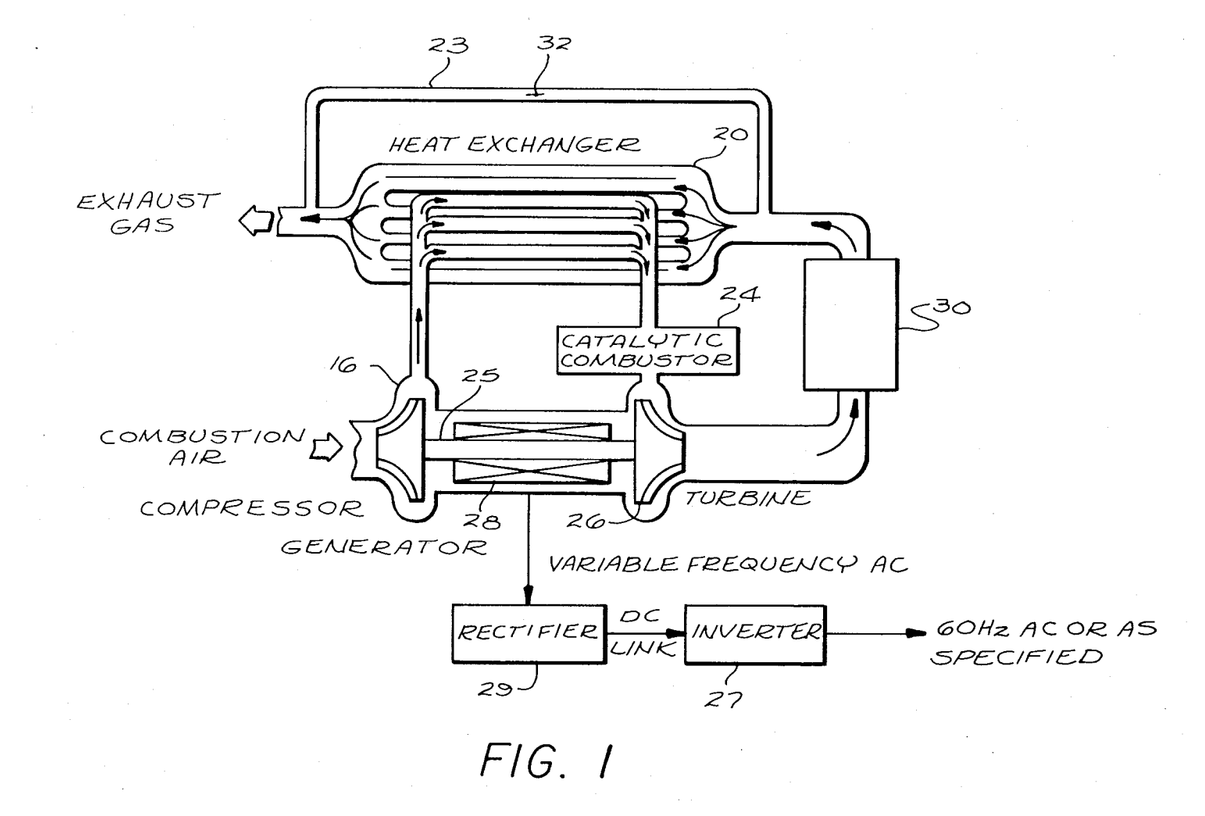
FIG. 1 is a simplified schematic of the power generation system of the present invention.

Referring to FIG. 1, a simplified schematic of the power generation system of the present invention is illustrated. The fuel air mixture enters compressor 16 where its pressure is boosted and sent to the cold side of the heat exchanger 20. In heat exchanger 20, the compressed fuel air mixture absorbs heat sufficient to raise its temperature to a level necessary to sustain combustion in the presence of a catalyst. Combustion chamber 24 contains any suitable catalyst capable of combusting the compressed, high temperature, fuel air mixture at the process conditions. Some known catalysts usable in the catalytic combustion chamber include platinum, palladium, as well as metal oxide catalyst with active nickel and cobalt elements. After combustion, the heated gases of the combustion product are directed to turbine 26. The energies and pressures created during combustion enable the combustion products to drive the turbine 26. After powering the turbine 26, the hot combustion gases return to the hot side of heat exchanger 20 where their enhanced temperature is used to heat the cooler incoming compressed fuel air mixture. In schematic FIG. 1, the exhaust gas is shown simply to exit heat exchanger 20, but since the exhaust gas still contains usable heat energy, it is a useable heat source, as will be later shown in greater detail.

Between turbine 26 and compressor 16, is generator 28. In the preferred embodiment of the present invention, the turbine 26, generator 28, and compressor 16 are one integrated unit and the work inputs and outputs are accomplished via a single shaft 25. It is understood that the present invention can be used without a generator, that is work produced and transmitted by shaft 25 can be applied directly, as in the case of a mechanically driven refrigeration system. The generator 28 produces alternating current.

In the preferred embodiment of the present invention, the compressor-generator-turbine speed can be varied as dictated by energy demands impressed on the system externally. Variations in the speed of the compressor-generator-turbine will of necessity produce a variation in the frequency of the alternating current produced by the generator. Regardless of the frequency of the power produced, it can be rectified to DC in rectifier 29, and then converted back to any specified frequency by inverter 27. Accordingly, when less power is required, the control system can reduce the speed of the turbine 26 without affecting the quality of the alternating current output. Reducing the speed of the system reduces the airflow, which leaves the turbine inlet temperature essentially constant, thus maintaining a high efficiency at part load. Heat exchanger bypass line 23, including valve 32 is provided to achieve thermal control.

Figure 2:
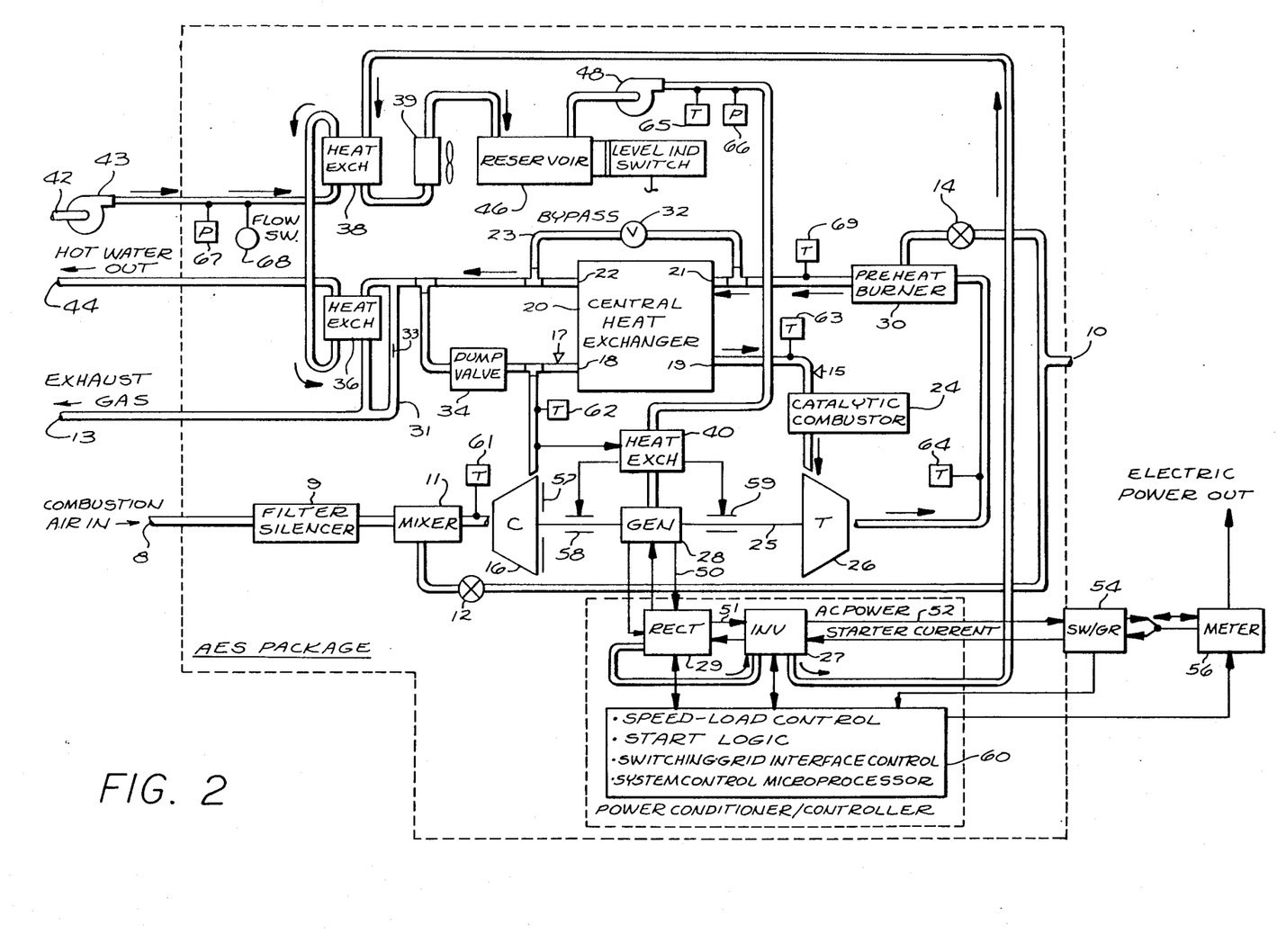
FIG. 2 is a more detailed description of the power generation system of the present invention of FIG. 1.

Referring to FIG. 2, a detailed understanding of power generation system is facilitated. The present invention is useable with both gaseous and liquid fuels. In gaseous fuel mode, fuel inlet 10 is supplied with any suitable gaseous fuel, preferably methane or natural gas. If field available natural gas is used, the methane content and BTU value may require stoichiometric adjustments. Natural gas may contain amounts of ethane, propane and heavier hydrocarbons, tending to raise the BTU value. Conversely, natural gas may contain inerts, such as nitrogen and carbon dioxide which tend to lower the BTU value. During steady state operation, the fuel enters at fuel inlet 10 and passes through first fuel inlet control valve 12. The fuel then travels to mixer 11. Combustion air enters at air inlet 8 through filter-silencer 9. Filter silencer 9 acts to filter out particulate contaminants and thereby protect the system internals. From filter silencer 9 the combustion air travels to mixer 11 where it is mixed with the fuel from first fuel inlet control valve 12. First fuel inlet control valve 12 is controlled to admit any amount of fuel necessary to operate the system in response to power or heating requirements placed on the system. Mixer 11 assists in forming a fuel-air mixture which then enters compressor 16.

Compressor 16 compresses, and thereby raises the pressure of, the fuel air mixture. The compressed fuel-air mixture then enters central heat exchanger 20 through heat receiving circuit inlet 18. The heat absorbed by the compressed fuel air mixture while in the central heat exchanger 20 will raise the temperature of the fuel air mixture to a sufficient level to enable it to combustibly react in the presence of a catalyst. The compressed fuel air mixture then exits via heat receiving circuit outlet 19. Then the hot compressed fuel air mixture enters catalytic combustion chamber 24 where in the presence of a suitable catalyst it combustibly reacts exothermically to form combustion products of an even higher temperature. The hot combustion products are then forced into turbine 26. Turbine 26 is then powered by these combustion products, producing useful work. The useful work is transmitted through shaft 25 to generator 28 and compressor 16.

In liquid fuel mode, the fuel may be injected between the heat receiving circuit outlet 19 of central heat exchanger 20, and catalytic combustion chamber 24 shown as fuel injection port 15. The injected fuel would then mix with the compressed air before reaching the catalytic combustion chamber 24. High pressure gaseous fuel may also be injected at this point if desired, or at port 17 to allow preheat of the fuel. Injection downstream of compressor 16 will prevent possible contamination and dirt buildup of compressor 16.

The use of a single shaft between a turbine, generator, and compressor adds to the compactness and reliability of the power generation system. The shaft 25 is supported by self pressurized air bearing 58 and air bearing 59, and held axially by air thrust bearing 57. The air bearings eliminate the need for a separate bearing lubrication system and reduce the occurrence of maintenance servicing.

Once the hot combustion products have powered turbine 26, they travel through preheat burner 30. The preheat burner 30, used during start, is not used during steady state operation. Preheat burner 30 is supplied with fuel through second fuel inlet control valve 14, which is in turn fed from fuel inlet 10. After leaving the preheat burner 30 heating area, the hot combustion products enter the heat transmitting circuit of heat exchanger 20 via heat transmitting circuit inlet 21. While traveling through the heat transmitting circuit of central heat exchanger 20, the hot combustion products provide heat to the fuel air mixture located in the heat receiving circuits of heat exchanger 20. In this way, part of the heat of combustion is resupplied to the incoming fuel to assist it in achieving its high temperature. After surrendering part of its heat, the hot combustion products exit central heat exchanger 20 via heat transmitting circuit outlet 22. Bypass line 23 is provided in parallel with the heat transmitting circuit of central heat exchanger 20 to allow hot combustion products to controllably circumvent the heat exchange process, in order to better control the process rates and temperatures. For example, on cold days when insufficient heat is available from the exhaust, the bypass may be opened and modulated to provide the necessary amount of heat required. Bypass line 23 is fitted with thermal bypass valve 32, to control the flow in bypass line 23. Also, dump valve 34 is provided between heat receiving circuit inlet 18 of central heat exchanger 20, and heat transmitting circuit outlet 22 of central heat exchanger 20.

In the preferred embodiment, during steady state operation, after the hot combustion products give up a part of their heat in the heat transmitting circuit of central heat exchanger 20 they proceed to exhaust heat water heater 36. While in exhaust heat water heater 36, the combustion products release another measure of heat before being piped off the situs of the system through combustion product exhaust 13. Exhaust bypass line 31 is provided to allow flexibility in the amount of heat provided to exhaust heat water heater 36. Exhaust bypass valve 33 in exhaust bypass line allows the control to allow exhaust gases to bypass or go through exhaust heat water heater 36. It is understood that after passing through combustion products exhaust 13, the combustion products may be further processed as desired. Further processing may include further heat exchange, combustion product separation and clarification, or further treatment before released to the atmosphere.

The power generation system of the present invention is also generally fitted with a hot water system which operates in conjunction with the power generation system's coolant system. Cool water inlet 42 is connected to an offskid water supply which provides a supply of water from a point external to the skid boundary. An optional offskid pump 43 may be used, but so long as an offskid water supply and water return are provided such that the pressure of the water supply is greater than the water return, it will suffice. Hot water outlet 44 is connected to a hot water return, also offskid. If the pressure of cool water inlet 42 is sufficiently greater than that of hot water outlet 44, then offskid pump 43 will not be necessary.

Water flows from cool water inlet 42, through offskid pump 43, to coolant heat sink exchanger 38. After heat is added to the water by coolant heat sink exchanger 38, the water proceeds to exhaust heat water exchanger 36, where it then picks up heat from the combustion products. The water, now having achieved its highest temperature in the system, exits through hot water outlet 44.

The compressor-generator-turbine assembly generates excess heat. Heat is generated in generator 28 due to inefficiencies in generator design. In order to extend the life of the generator 28 assembly, as well as to capture useful heat, a coolant system is provided. Equipment heat exchanger 40 acts to draw heat generated by operation of generator 28. Any acceptable coolant can be used in the coolant system of the power generation system of the present invention. The coolant passes through equipment heat exchanger 40, absorbing excess heat from the generator 28, rectifier 29, and inverter 52. After the coolant has absorbed heat from the aforementioned sources, it travels to coolant heat sink exchanger 38, and gives up its heat to the incoming water, as previously mentioned. A fan coil exchanger 39 can be employed to dissipate heat when it is not desired to heat water. The coolant then flows to reservoir 46. The coolant is drawn from reservoir 46 by coolant pump 48. Coolant pump 48 pumps the coolant back to equipment heat exchanger 40 to complete the coolant cycle.

The electrical generation system is as follows: Generator 28 is expected to turn at about 80,000 RPM when the system is powered to 100%. The frequency of output is therefore quite high at 2,666 hertz, or for a two pole generator, at 1,333 hertz. Since differing power levels of turbine operation will produce differing generator speeds, generator 28 can be expected to produce variable frequency alternating current 50 as a direct generation product. The variable frequency alternating current 50 is then fed into rectifier 29. Rectified direct current 51 is produced by rectifier 29 which is then fed into inverter 27, and inverter 27 then produces alternating current power 52, which can be either a constant or variable frequency. The variable frequency variable voltage power can be used for variable speed motor drives.

This arrangement allows for a wide flexibility in determining the electric utility service to be provided by the power generation system of the present invention. Because any inverter can be selected, frequency of inversion can also be selected at will. The inverter battery storage capacity can be selected, in combination with the inverter requirements, to produce uninterruptible power for hours after generator failure. If there is a direct use for high frequency power, the rectifier and inverter can be eliminated. When high frequency power is used for fluorescent lights, not only does the lamp operate more efficiently, but the inductor balast is replaced by a capacitor balast. Direct high frequency voltage used in a lighting system can result in a 25% greater efficiency. If it is decided to eliminate inverter 52 yet keep rectifier 29, the resulting direct current can be used for plating, elevator operation and incandescent lighting.

Switch/starter controls 54 are provided to startup and operate the power generation system of the present invention and are shown in FIG. 2 as being located offskid. Meter 56 provides electric power measurement. This is entirely optional and can be used to measure efficiency, or as a basis for charging for metered power sold to electric utilities or others.

It is foreseeable that the power generation system of the present invention may be operated intermittently. The power generation system is designed for easy startup. In order to start up a "cold" power generation system, preheat burner 30 is used to bring the system heat up to a point of operability. With first fuel inlet control valve 12 closed, second fuel inlet control valve 14 is opened, allowing fuel to directly enter the preheat burner 30. As the system is motored over, air is pushed, at low temperature through the compressor 16 and turbine 26. Preheat burner 30 uses oxygen in this stream to burn the fuel within the burner. A spark or other device is used to ignite a flame whose combustion products travel through central heat exchanger 20. As the temperature of the heat transmitting circuit of central heat exchanger 20 rises, so will the temperature of the incoming air. Once the catalytic combustion chamber 24 and the incoming air reaches and exceeds lightoff temperature for a fuel air mixture, were such a mixture present, fuel gas inlet control valve is opened and second fuel gas inlet control valve is closed. The fuel air mixture enters and continues through central heat exchanger 20 where it is heated and to catalytic combustion chamber 24 where it begins to ignite and increase the speed of the system. Then the hot combustion products from turbine 26 begin to supply central heat exchanger 20 with the heat necessary to heat the incoming compressed fuel air mixture sufficiently to sustain continuous, steady state combustion in central heat exchanger 20. That is, the system will produce enough of its own heat to be self-sustained.

The power generation system of the present invention is equipped with controller 60. Controller 60 is connected to low pressure fuel air temperature sensor 61, high pressure fuel air temperature sensor 62, high temperature fuel-air temperature sensor 63, after turbine combustion products temperature sensor 64, coolant temperature sensor 65, coolant system pressure sensor 66, water pressure sensor 67, water flow sensor switch 68 and preheat burner process temperature sensor 69. Using the aforementioned sensors, controller 60 will supervise both startup and system optimization during steady state operation. For example, when preheat burner process temperature sensor 69 is sufficiently hotter than is necessary for the combustion processes to become self-perpetuating, controller 60 will cause first fuel inlet control valve 12 to open, and second fuel inlet control valve 14 to shutdown. Controller 60 will use all of the other sensors to help determine the external demands upon the power generation system, as well as the internal orientation of the power generation system necessary to produce maximum efficiency. Controller 60 will control, for example, thermal bypass valve 32 as well as dump valve 34. Controller 60 will have the ability to gauge the electrical power demands being made on the system, and adjust first fuel inlet control valve 12 to increase the power generation of the system. Controller 60 can also be made to measure the state of direct current storage in a battery if supplied in the inverter 27, and adjust operations to maintain conditions of net charge, net drain, constant charge.

Figure 3:
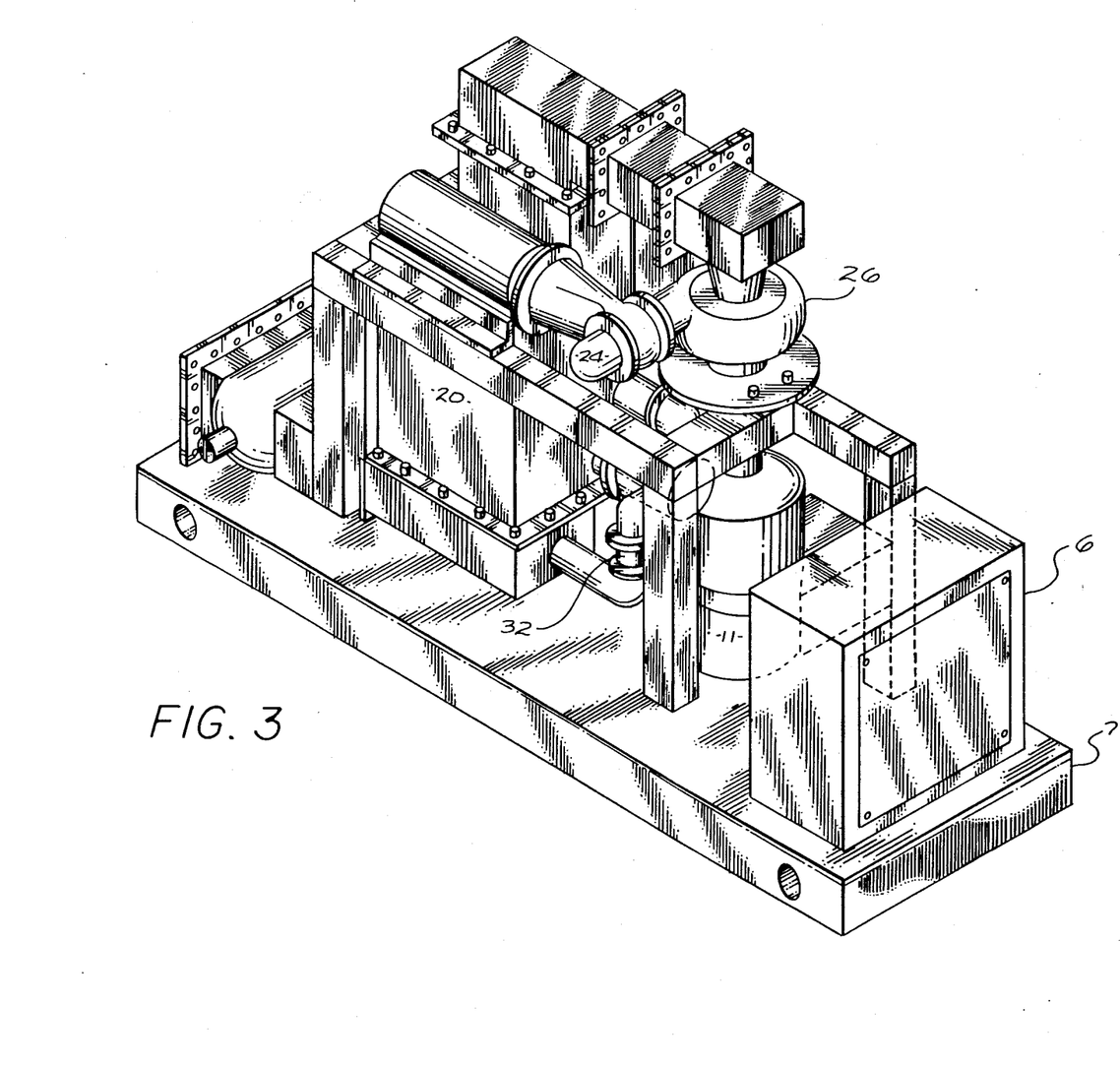
FIG. 3 is an isometric view of the skidded packaged power generation system unit of FIGS. 1 and 2.

Referring to FIG. 3, the cogeneration system can be built as a compact unit mounted on skid 7. The width, length and height can be adjusted to fit a wide variety of dimensional requirements.

The power generation system can be built in several major modules such as the rotor group, the heat exchanger group, the catalytic combustion chamber, and the inverter and control system. Each of these is relatively lightweight and compact. They can be replaced without breaking liquid lines, except for the coolant loop. Due to the use of air bearings in the compressor generator turbine assembly, the maintenance of the power generation system of the present invention should be quite low. Scheduled maintenance will consist primarily of changing the filters in filter silencer 9, and replacing catalyst elements.

Potential uses of this power generation system are many and diverse. It can be used as a source of electricity and heat for fast food restaurants. It can be used to drive air conditioning equipment. The present power generation system could be used to provide electricity and heat in remote locations of the oil patch where hydrocarbon energy is readily available, while electrical power is not. In fact, this system could be used in almost every situation requiring more than just an electric generator (for example where heat is required, in addition to electrical or mechanical energy).

While specific embodiments of this power generation system have been disclosed in the foregoing description, it is intended that many modifications and adaptations should, and are intended to be comprehended within the meaning and range of this invention, without any such modifications and adaptations causing a departure from the spirit and scope of the invention.

Having described the invention with sufficient clarity that those skilled in the art may make and use it; what is claimed is:

1. A device for combusting fuel and deriving work therefrom comprising:
    means for mixing air and fuel and having an air inlet for receiving air and a fuel for receiving fuel;
    compression means connected to said mixing means for compressing said air and fuel mixture;
    heat exchanging means connected to said compression means adding heat to said compressed air and fuel mixture;
    catalytic combustion means connected to said heat exchanging means for combusting heated compressed fuel and air mixture;
    turbine means, for converting energy released from combustion into mechanical energy, and connected to said heat exchanging means to provide heat to said compressed air and fuel mixture;
    transduction means for converting the mechanical energy produced by said turbine means into electrical energy;
    a shaft, linking said compression means, said turbine means, and said transduction means, to allow mechanical energy extracted by said turbine means to be utilized by said transduction means and said compression means; and
    means between said turbine means and said heat exchanger means to provide heat during startup.

2. The device of claim 1 wherein said transduction means further comprises:
    a generator, powered by mechancal energy from said turbine, which produces alternating electric current;
    a rectifier into which the alternating electric current produced by said generator flows, said rectifier rectifying said alternating current to direct current;
    an inverter which accepts direct current and converts the direct current to alternating current of a preselected frequency.

3. The device of claim 2 wherein said generator is a permanent magnet brushless generator.

4. The device of claim 1 wherein the electrical energy is an alternating current, the frequency of which is independent of the speed of said turbine.

5. The device of claim 1 further comprising:
    means to start said compression means and said turbine means and said heat exchanging means during startup.

6. The device of claim 1 wherein said fuel is a gaseous fuel.

7. The device of claim 2 further comprising:
    support means for said fuel inlet, said air inlet, said mixing means, said compression means, said heat exchanging means, said combustion means, said turbine means, said generator, said rectifier, and said inverter, to enable said device to exist as a packaged unit.

8. A power generation system comprising:
    a catalytic combustor receiving a compressed, elevated temperature fuel-air mixture to react with the catalyst in said combustor to produce high energy reaction products;
    a gas turbine receiving the high energy, reaction products from said catalytic combustor to expand said products therethrough and derive useful rotational work therefrom;
    a compressor having a common shaft with said gas turbine and driven thereby to receive a fuel-air mixture and raise the pressure thereof;
    a heat exchanger receiving the compressed fuel-air mixture from said compressor and said high energy reaction products from said catalytic combustor to remove heat from the reaction products and add heat to the fuel-air mixture;
    a preheat burner operably disposed between said turbine exhaust and said heat exchanger to receive and combust fuel during startup of the system to preheat the fuel-air mixture from said compressor to a temperature sufficient to initiate the catalytic reaction within said catalytic combustor until the reaction products from said catalytic combustor are sufficient in temperature to raise the fuel-air mixture to a temperature sufficient to maintain the catalytic reaction; and
    an electrical generating means operably associated with said gas turbine and driven thereby to produce electrical energy.

9. A power generating system comprising:
    a catalytic combustor receiving a compressed, elevated temperature fuel-air mixture to react with the catalyst in said combustor to produce high energy reaction products;
    a gas turbine receiving the high energy, reaction products from said catalytic combustor to expand said products therethrough and derive useful rotational work therefrom;
    a compressor having a common shaft with said gas turbine and driven thereby to receive air and raise the pressure thereof;
    a heat exchanger receiving the compressed air from said compressor and said high energy reaction products from said catalytic combustor to remove heat from the reaction products and add heat to the air; and
    a preheat burner operably disposed between said turbine exhaust and said heat exchanger to receive and combust fuel during startup of the power generating system to preheat the air from said compressor to a temperature sufficient, when said compressed air is mixed with fuel, to initiate the catalytic reaction within said catalytic combustor until the reaction products from said catalytic combustor are sufficient in temperature to raise the air to a temperature sufficient to maintain the catalytic reaction.

10. A co-generation device comprising:
a filter capable of filtering inlet air;
a mixer for mixing air and a fuel, and connected to said filter;
a compressor for compressing said air and said fuel, said compresor connected to said mixer;
a main heat exchanger having a cold side and a hot side, each having an inlet and an outlet, said cold side inlet connected to said compressor;
a catalytic combustor connected to said cold side outlet of said main heat exchanger;
a turbine, having an inlet and an outlet, said inlet connected to said catalytic combustor;
a preheat burner, connected to said outlet of said turbine, to supply initial heat in order to start the cogeneration device, the preheat burner connected to said hot side inlet of said main heat exchanger;
a recovery heat exchanger, connected to said hot side outlet of said main heat exchanger, to recover heat for use for any purpose; and
a generator set mechanically connected to said turbine, for producing electric energy from mechanical work supplied by said turbine.

11. The cogeneration device of claim 10 further comprising:
a rectifier, connected to said generator set, for receiving electric energy produced by said generator set, said rectifier rectifying said electrical energy produced to direct current electric energy;
an inverter which accepts direct current electrical energy from said rectifier, and converts the direct current electrical energy to alternating current electrical energy of a preselected frequency.

12. A device for catalytically combusting fuel and deriving work therefrom comprising:
means for admitting fuel to said device;
means for admitting combustion air to said device;
means for mixing said combustion air with said fuel to form a combustible mixture;
means for compressing said combustible mixture;
a main heat exchanger having a cold side inlet; a cold side outlet; a hot side inlet and a hot side outlet, said cold side inlet in mass flow communication with said cold side outlet, and said hot side inlet in mass flow communication with said hot side outlet, said cold side inlet capable of inletting said compressed combustible mixture to add heat thereto and raise the temperature thereof;
catalytic combustion means, downstream of and connected to said cold side outlet, for combusting said combustible mixture;
a turbine means, connected to said combustion means for extracting mechanical work from said combustion means, said turbine means connected to said hot side inlet of said main heat exchanger, said combusted mixture to provide heat to said combustible mixture as it flows through said heat main exchanger, said combusted mixture then passing through said hot side outlet of said heat main exchanger; and burner means connected between said turbine means and said hot side inlet of said main heat exchanger to provide heat during startup.

13. The device of claim 12 wherein said fuel is natural gas in the gaseous state.

14. The device of claim 12 wherein said turbine means is mechanically connected to said means for compressing, wherein said extracted mechanical work due to said combustion means is used to drive said means for compressing.

15. The device of claim 12 further comprising:
transduction means for converting the mechanical energy produced by said turbine means into electrical energy, said transduction means also capable of motoring over said means for compressing and said turbine means during startup.

16. The device of claim 15 wherein said transduction means further comprises:
a generator, powered by mechanical energy from said energy released by said combustion, extracted by said turbine, which produces alternating electric current energy;
a rectifier into which the alternating electric current energy produced by said generator flows, said rectifier for the purpose of rectifying said alternating current electrical energy to direct current electrical energy;
an inverter which accepts said direct current electrical energy and converts it to alternating current electrical energy having a constant preselected frequency.

17. The device of claim 15 further comprising:
secondary heat exchange means, connected to said hot side outlet of said main heat exchanger, for extracting further heat energy from said combustible mixture, after said combustible mixture flows through said main heat exchanger.

18. The device of claim 15 further comprising:
shaft means for mechanically connecting said turbine means, said means for compressing, and said transduction means, to allow mechanical work extracted from said turbine means to be operably transmitted to said transduction means and said means for compressing to power same.

19. The device of claim 18 wherein said transduction means further comprises:
a generator, powered by mechanical energy from said energy released by said combustion, extracted by said turbine, which produces alternating electric current energy;
a rectifier into which the alternating electric current energy produced by said generator flows, said rectifier for the purpose of rectifying said alternating current electrical energy to direct current electrical energy;
an inverter which accepts said direct current electrical energy and converts it to alternating current electrical energy having a constant preselected frequency.

20. The method of co-generating electricity and heat from fuel comprising the steps of:
forming a fuel-air mixture;
compressing said fuel-air mixture;
heating the compressed fuel-air mixture;
catalytically combusting said mixture;
expanding the combustion products through a turbine to produce mechanical energy;

utilizing the heat from the expanded combustion products in the air-fuel mixture heating step; and preheating the compressed fuel-air mixture during startup.

21. The method of claim 20 further comprising the step of:

generating electricity using said mechanical energy produced.

22. The method of claim 20 further comprising the step of:

using said mechanical energy produced to operate a refrigeration unit.

23. The method of claim 20 further comprising the step of:

using any heat resulting from said combustion, which was not used to accomplish said heat adding step, as a utility heat source.

24. The method of claim 21 wherein said generating electricity step further comprises the steps of:

powering an alternating current generator to produce alternating current electric energy, the frequency of said alternating current electric energy varying with the rotational speed of said generator;

rectifying said variable frequency alternating current electrical energy to produce direct current electrical energy;

inverting said direct current electrical energy to produce the required frequency alternating current electrical energy.

25. A power generating system used to convert fuel into electrical energy and heat energy comprising:

a fuel inlet;

an air inlet having a filter, to admit air and filter out any contaminants contained in the air;

a first fuel control valve connected to said fuel inlet to regulate the amount of fuel admitted to said fuel inlet;

a mixer having two inputs and an output, one said input connected to said first fuel control valve, the other said input connected to said air inlet;

a compressor, having an inlet and an outlet, said compressor inlet connected to said mixer output, for accepting and compressing the air-fuel mixture;

a central heat exchanger having a heat receiving circuit and a heat transmitting circuit, said heat receiving circuit connected to said outlet of said compressor, to admit and add heat to said air-fuel mixture;

a catalytic combustion chamber, having an inlet and an outlet, and containing a catalyst suitable for combusting said fuel-air mixture at a pre-specified design temperature to form combustion products, said catalytic combustion chamber inlet connected to said heat receiving circuit of said central heat exchanger, to accept said fuel-air mixture after heat has been added in said heat exchanger;

a turbine, having an input and an output, said turbine input connected to said catalytic combustion chamber outlet to accept and become powered by the flow of combustion products formed in said catalytic combustion chamber, said turbine further having a shaft capable of transmitting mechanical energy imparted to said turbine by the flow of said combustion products;

a preheat burner, having an inlet and an outlet, said inlet connected to said turbine output to provide heat during start-up to raise the heat of the system sufficiently for combustion to begin, and thereafter to be deactivated, said preheat burner outlet connected to said heat transmitting circuit of said central heat exchanger, to transmit some of the heat produced by combustion, to said fuel-air mixture to raise its temperature to a level sufficient to cause combustion when said fuel-air mixture is in the presence of said catalyst;

exhaust heat water heater having a heat transmitting circuit and a heat receiving circuit, said heat transmitting circuit of said exhaust heat water heater connected to accept flow of said combustion products from said heat transmitting circuit of said central heat exchanger;

an exhaust conduit connected to said heat transmitting circuit of said exhaust heat water heater to assist in transporting the combustion products to any location for exhaust;

a water inlet;

a water outlet;

a coolant heat sink exchanger having a heat receiving circuit and a heat transmitting circuit, said heat receiving circuit connected to said water inlet to receive cool water, said heat receiving circuit of said coolant heat sink exchanger connected to said heat receiving circuit of said exhaust heat water heater to enable said exhaust heat water heater to receive water from said coolant heat sink exchanger, and said heat receiving circuit of said exhaust heat water heater connected to said water outlet, which provides hot water for any use;

a generator set having a rotatable shaft connected to said shaft of said turbine, to enable said turbine to transmit mechanical work to said generator set to enable said generator set to produce useful electrical energy;

an equipment heat exchanger having a heat receiving surface and a heat receiving circuit, said heat receiving surface to assist in drawing frictional heat away from said turbine, said compressor and said generator set, said heat receiving circuit to accept, transmit heat into and pass along any suitable liquid coolant, said heat receiving circuit of said equipment heat exchanger connected to said heat transmitting circuit of said coolant heat sink exchanger to allow said coolant to flow from said equipment heat exchanger to said coolant heat sink exchanger; and a pump having an input and an output, said input of said pump operably connected to said heat receiving circuit of said coolant heat sink exchanger, to accept the flow of cooled coolant and pump same, the said output of said pump connected to said heat receiving circuit of said equipment heat exchanger, in order to complete the path of flow for said coolant.

26. The power generating system of claim 25 further comprising:

a controller to operably sense conditions within the system and to control said first fuel control valve and said preheat burner.

27. The power generating system of claim 26 further comprising:

a thermal bypass valve connected in parallel with said heat transmitting circuit of said main heat exchanger; and a dump valve connected between said outlet of said compressor and said heat transmitting circuit of said exhaust heat water heater.

28. The power generating system of claim 27 wherein said controller further comprises:

temperature sensors located on said compressor outlet, said catalytic combustion chamber inlet, said turbine outlet, said outlet of said preheat burner, and said pump outlet, said controller having controllability over said thermal bypass valve and said dump valve in addition to said first fuel control valve and said preheat burner, in order to maximize the operational efficiency of the system.

* * * * *